United States Patent [19]
Okamoto

[11] Patent Number: 5,943,419
[45] Date of Patent: Aug. 24, 1999

[54] SUBSCRIBER CIRCUIT WITH BUILT-IN POLARITY SWITCHING CIRCUIT

[75] Inventor: Ryuichi Okamoto, Tokyo, Japan

[73] Assignee: NEC Corporation, Tokyo, Japan

[21] Appl. No.: 08/910,246

[22] Filed: Aug. 13, 1997

[30] Foreign Application Priority Data

Aug. 15, 1996 [JP] Japan .................................. 8-233593

[51] Int. Cl.$^6$ .................................................. H04M 1/00
[52] U.S. Cl. .......................................... 379/382; 379/399
[58] Field of Search .................................... 379/350, 382, 379/377, 399, 146, 148, 132, 155; 330/260, 270, 271, 291, 85, 150

[56] References Cited

U.S. PATENT DOCUMENTS

| | | | |
|---|---|---|---|
| 4,430,621 | 2/1984 | Weiser et al. | 330/9 |
| 4,760,595 | 7/1988 | Arai | 379/385 |
| 5,124,663 | 6/1992 | McEntarfer et al. | 330/9 |
| 5,329,588 | 7/1994 | Willocx et al. | 379/413 |
| 5,446,405 | 8/1995 | Ikeda | 327/362 |
| 5,511,118 | 4/1996 | Gores et al. | 379/399 |

FOREIGN PATENT DOCUMENTS

61-113354  5/1986  Japan .

*Primary Examiner*—Reinhard J. Eisenzopf
*Assistant Examiner*—Charles N. Appiah
*Attorney, Agent, or Firm*—Foley & Lardner

[57] ABSTRACT

The subscriber circuit has a balanced amplifier and a built-in call-current polarity changing circuit. Moreover, the output stage circuits of the direct feed-back and offset cancel circuits of the subscriber circuit have the same configuration. By switching the input voltage supplied to the direct feed-back and offset cancel circuits by a switch, the signals fed back to the inputs of the balanced amplifier are switched. Thus, the polarity of the loop current can be inverted. Furthermore, it is possible to switch the loop current without adopting an extra circuit, and the part of the circuit in which the switches are not required to withstand pressure can be constructed with CMOS thereby allowing minimization of the circuit size.

20 Claims, 7 Drawing Sheets

CMOS CONFIGURATION
(OPERATING WITH +5 SYSTEM)

SUBSCRIBER CIRCUIT WITH BUILT-IN POLARITY SWITCHING CIRCUIT

BACKGROUND OF THE INVENTION

The present invention relates to a subscriber circuit, particularly to that with a built-in polarity switching circuit of a call-current.

DESCRIPTION OF THE RELATED ART

Conventionally, as to the subscriber circuits of this type, one aim is to supply the loop current to the subscriber lines. Moreover, the conventional subscriber circuits require call-current polarity switching circuits in order to transmit meter pulsing signals etc. for pay phones. Generally, there are two types of IC for subscriber circuits: one is built in and the other is equipped outside. Usually, a feeding before the polarity switching is called a normal feeding while it is called a reverse feeding after the polarity switching.

Figure 1:
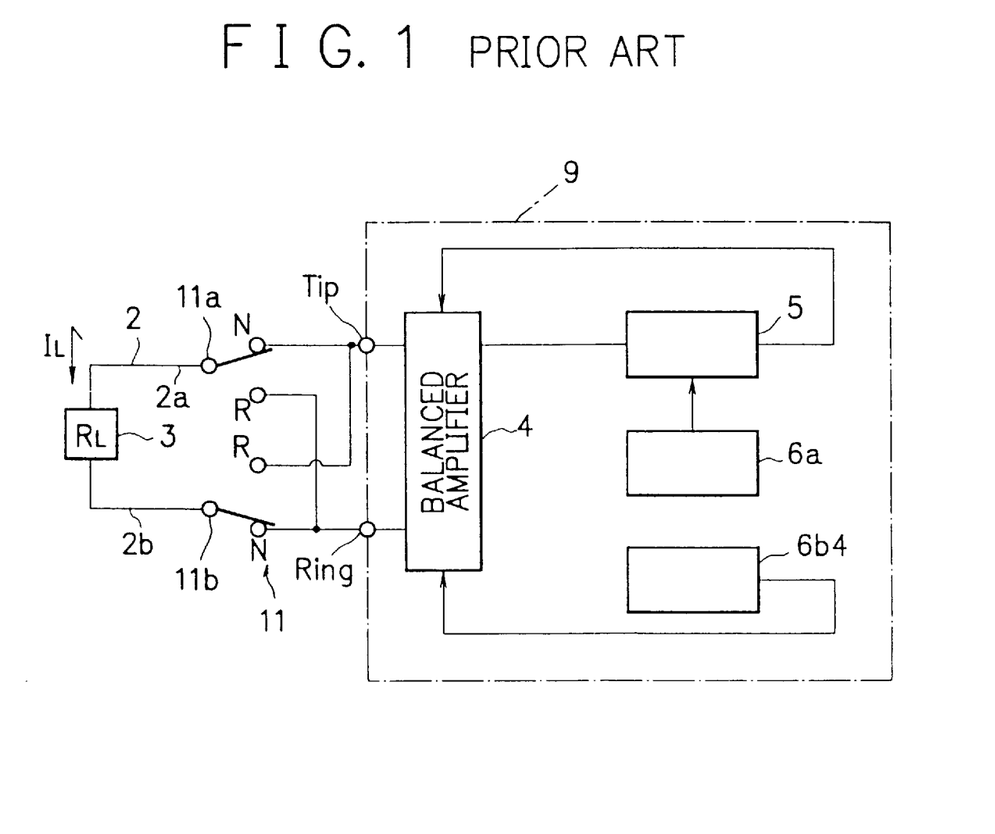
FIG. 1 is a block diagram showing one example of the conventional feeder circuit with the call-current polarity switching circuit equipped outside.
Figure 2:
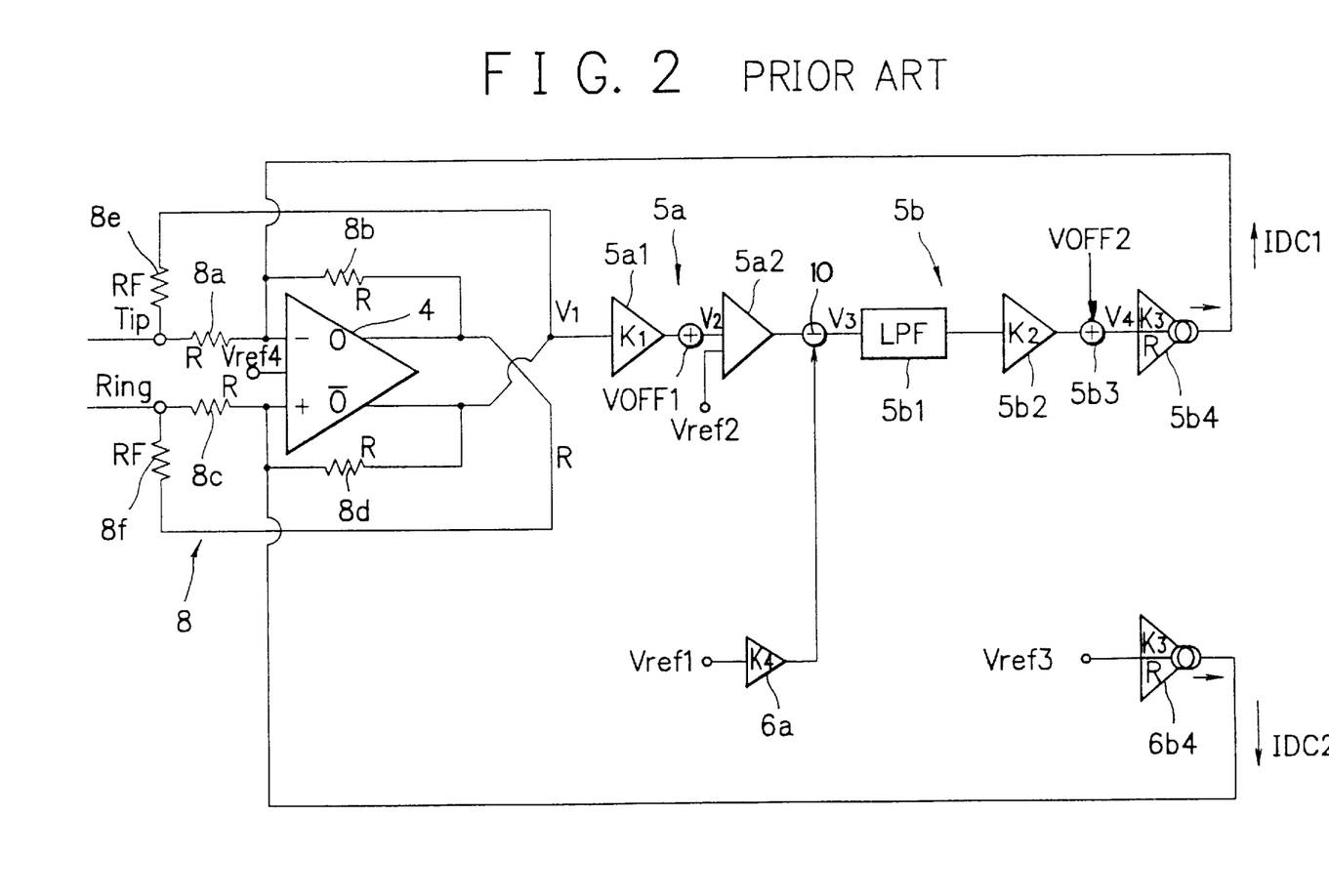
FIG. 2 is a circuit diagram showing a specific circuit configuration of the circuit shown in FIG. 1.

Now, FIGS. 1 and 2 are to be used in describing the configuration of the direct feeding division of the conventional subscriber circuit with the call-current polarity switching circuit equipped outside. Hereafter, in each Figure same reference codes are used in indicating the same elements.

FIG. 1 is a block diagram showing a direct feeding division of the conventional subscriber circuit with the call-current polarity switching circuit adopted externally. FIG. 2 is a diagram showing a specific circuit configuration of the circuit shown in FIG. 1.

In the conventional subscriber circuit, there is provided a balanced amplifier 4 of an input/output differential type having a positive (direct) and a negative (inverse) input terminals (+) and (−), and a direct and an inverse output terminals 0 and $\overline{0}$. Each of the direct and the inverse output terminal amplifies a voltage in between the positive (direct) and the negative (inverse) input terminals of the balanced amplifier 4 so as to generate respectively a voltage of a same amplitude but a different polarity around a reference voltage VREF4. In between the inverse output terminal $\overline{0}$ and a Tip terminal, there is connected a resistance 8e, while in between the direct output terminal 0 and a Ring terminal, there is connected a resistance 8f. Both of the resistances 8e and 8f have a resistance value RF. The negative (inverse) input terminal (−) and the direct output terminal 0 of the balanced amplifier 4 are subjected to a feed-back from the Tip terminal through resistances 8a and 8b having a resistance value R. Similarly, the positive (direct) input terminal (+) and the inverse output terminal are subjected to a feed-back from the Ring terminal through resistances 8c and 8d having the resistance value R. Thus in the conventional subscriber circuit, there is constructed a unit inverting amplifier.

The inverse output terminal $\overline{0}$ of the balanced amplifier 4 is connected to an input terminal of a first amplifier 5a1 of which output signal is to connected to a first direct input terminal of a voltage discrimination circuit 5a2 after a first offset voltage VOFF1 is added. To a second direct input terminal of a voltage discrimination circuit 5a2, a second reference voltage VREF2 is to be inputted.

As already mentioned, this voltage discrimination circuit 5a2 has two direct input terminals, the first and the second direct input terminals, of which the input voltage of a higher value is valid. Moreover, the voltage discrimination circuit 5a2 outputs with a low impedance a voltage having the same value as the valid input voltage. Thus the voltage discrimination circuit 5a2 also serves as what is called a buffer amplifier.

2

An output terminal of the second voltage discrimination circuit 5a2 is connected to a first input terminal of a subtracter 10. A third amplifier 6a has an input terminal connected to a first reference voltage VREF1, and an output terminal connected to a second terminal of the subtracter 10.

An output terminal of the subtracter 10 is connected to an input of a first low-pass filter 5b1.

An output of the low-pass filter 5b1 is connected to an input terminal of the second amplifier 5b2, and an output terminal of the second amplifier 5b2 is connected to a first input terminal of a first adder 5b3. To a second input terminal of the first adder 5b3, a second offset voltage VOFF2 is to be inputted.

An output from the first adder 5b3 is connected to an input of a first voltage/current conversion circuit 5b4, and an output of the first voltage/current conversion circuit 5b4 is connected to the inverse input terminal (−) of the balanced amplifier 4.

To a second voltage/current conversion circuit 6b4, a third reference voltage VREF3 is inputted, and an output of the second voltage/current conversion circuit 6b4 is connected to the direct input terminal (+) of the balanced amplifier 4.

The Tip terminal has a first terminal of a first relay 11a externally adopted, while the Ring terminal has a first terminal of a second relay 11b externally adopted. In between a second terminal of the first relay 11a and a second terminal of the second relay 11b, a loop resistance 3 is connected. Moreover, a third terminal of the first relay 11a is connected to the Ring terminal, and a third terminal of the second relay 11b is connected to the Tip terminal.

Next, there will be a description of the operation of the conventional circuit with reference to FIGS. 1 and 2.

First of all, the operation of the conventional circuit at the time of normal feeding will be describe.

At the time of normal feeding, the first and the second relays 11a and 11b are connected respectively to parts indicated as N in FIG. 1. If an inverse output voltage of the balanced amplifier 4 is to be V1, this voltage V1 is to be multiplied by K1 at the first amplifier 5a1, and further added to the offset voltage VOFF1 at the first amplifier 5a1. Consequently, an output voltage V2 of the first amplifier 5a1 is to be given by the following formula (1).

$$V2 = K1 \cdot V1 + VOFF1 \tag{1}$$

Then the output voltage V2 of the first amplifier 5a1 and the second reference voltage VREF2 are to be compared at the following input terminal of the voltage discrimination circuit 5a2.

First, in case when assuming that V2 is larger than VREF2, the voltage V2 is to be outputted from the voltage discrimination circuit 5a2 and inputted to the first input terminal of the subtracter 10.

The third amplifier 6a is being inputted the first reference voltage VREF1 and outputs an output voltage K4·VREF1 to the second input terminal of the subtracter 10.

Then the subtracter 10 conducts a subtraction between the output voltage V2 of the voltage discrimination circuit 5a2 and the output voltage K4·VREF1 of the third amplifier 6a.

Accordingly, an output voltage V3 of the subtracter 10 is to be given by the following formula (2).

$$V3 = V2 - K4 \cdot VREF1 \qquad (2)$$
$$= (K1 \cdot V1 + VOFF1) - K4 \cdot VREF1$$

Generally, the value of each K4 and VREF1 is determined so that the offset voltage VOFF1 would equal to K4·VREF1; and then the offset voltage VOFF1 is canceled at this subtracter 10.

Consequently, the output voltage V3 of the subtracter 10 is to be given by the following formula (3)

$$V3 = K1 \cdot V1 \qquad (3)$$

The output voltage V3 from the first subtracter 10 is to have an alternating component eliminated by passing through the first low-pass filter 5b1.

The output voltage V3 of the first low-pass filter 5b1 is to be multiplied by K2 at the second amplifier 5b2 and is to be outputted to the first adder 5b3.

In the first adder 5b3. the output voltage of the second amplifier 5b2 and the offset voltage VOFF2 is added together so as to output to the first voltage/current conversion circuit 5b4 a voltage as given in the following formula (4).

$$V4 = K1 \cdot K2 \cdot V1 + VOFF2 \qquad (4)$$

Since the first voltage/current conversion circuit 5b4 has a voltage/curent conversion coefficient K3/R, an output current IDC1 of the first voltage/current conversion circuit 5b4 is to be given by the following formula (5).

$$IDC1 = K3 \cdot V4 / R \qquad (5)$$
$$= K3 \cdot (K1 \cdot K2 \cdot V1 + VOFF2) / R$$

Then this current IDC1 is to be feed-backed to the inverse input terminal (−) of the balanced amplifier 4.

In the second voltge/current conversion circuit 6b4, the third reference voltage VREF3 is to be current-converted by the coefficient K3/R, and so the output current IDC2 of the second voltage/current conversion circuit 6b4 is to be provided by the following formula (6).

$$IDC2 = K3 \cdot VREF3 / R \qquad (6)$$

Then this current IDC2 is to flow into the direct input terminal (+) of the balanced amplifier 4.

Incidentally, hereafter, the output voltage of the balanced amplifier 4 or the second reference voltage VREF2 being multiplied by a certain coefficient number to become a current to be sent to the input terminal of the balanced amplifier 4 is to be called a "direct feed-back current". Moreover, a current which is sent to the input terminal of the balanced amplifier 4 for the purpose of canceling the offset current being superimposed on the direct feed-back current is to be called an "offset cancel current".

Now, a loop current IL flowing to the loop resistance 3 is to be acquired. Here, a voltage of the Tip terminal is to be VTip.

When the direct fed-back current IDC1 is feed-backed to the inverse input terminal (−) of the balanced amplifier 4, and the offset cancel current IDC2 is being sent to the direct input terminal (+) of the balanced amplifier 4, the following formula (7) is to be given.

$$V1 = VTip + IDC1 \times (R/2) - IDC2 \times (R/2) \qquad (7)$$

At this point, when formulas (5) and (6) are applied to formula (7), the following formula (8) is to be given.

$$V1 = VTip + \{K3 \cdot (K1 \cdot K2 \cdot V1 + VOFF2)/R\} \times (R/2) - K3 \cdot (VREF3/R) \times (R/2) \qquad (8)$$

Since the third reference voltage VREF3 is the voltage for canceling the second offset voltage VOFF2, VREF3 equals VOFF2. Therefore, the following formula (9) is to be provided.

$$V1 = VTip - \{(K1 \cdot K2 \cdot K3 \cdot V1)/R\} \times (R/2) \qquad (9)$$

When this formula is to be solved for V1, the following formula (10) is to be given.

$$V1 = 2 \cdot VTip/(2 - K1 \cdot K2 \cdot K3) \qquad (10)$$

Furthermore, the loop current IL is to be given by the following formula (11).

$$IL = (V1 - VTip)/RF \qquad (11)$$

Moreover, when formula (10) is applied to formula (11), the following formula (12) is to be given.

$$IL = [VTip \cdot \{2/(2 - K1 \cdot K2 \cdot K3) - 1\}]/RF \qquad (12)$$

Here the following formula (13) is provided.

$$\{1 - 2/(2 - K1 \cdot K2 \cdot K3)\}/RF = 1/RDC \qquad (13)$$

Then the following formula (14) is to be given which indicates that a constant resistance feeding is being realized.

$$IL = -VTip/RDC \qquad (14)$$

The feed resistance RDC can be voluntarily set by altering gains K1 and K2 of the first and the second amplifiers 5a1 and 5b2, as well as altering gain K3 of the first voltage/current conversion circuit 5b4.

Here, due to the nature of the balanced amplifier 4, when a current being sent to the inverse input terminal (−) of the balanced amplifier 4 is larger than that being sent to the direct input terminal (+), it is arranged that the current is to flow in the direction of the Ring terminal from the Tip terminal. On the other hand, when the current being sent to the inverse input terminal (−) of the balanced amplifier 4 is smaller than that being sent to the direct input terminal (+), it is arranged that the current is to flow in the direction of the Tip terminal from the Ring terminal. However, according to the conventional feeding circuit, since IDC1 is always larger than IDC2, the loop current IL has no choice but to flow in the direction of the Ring terminal from the Tip terminal.

Therefore, in the conventional feeding circuit, in order to switch the polarity of the loop current so as to reverse feed, the polarity switching relays 11 which are equipped externally, are to be switched in to the side of R from N.

Second, as opposed to the case in which V2 is larger than VREF2 as described above, now the case where V2 is smaller than VREF2 is to be taken into consideration. If considering in the same manner of the above-mentioned constant resistance feeding, the output voltage V3 of the subtracter 10 is to be given by the following formula (15).

$$V3 = VREF2 - K4 \cdot VREF1 \qquad (15)$$

This output voltage V3 of the subtracter 10 is to be multiplied by K2 at the second amplifier 5b2, and added the second offset voltage VOFF2 at the first adder 5b3.

Accordingly, an output voltage V4 from the first adder 5b3 is to be given by the following formula (16).

$$V4 = K2 \cdot (VREF2 - K4 \cdot VREF1) + VOFF2 \qquad (16)$$

This output voltage V4 of the first adder 5b3 is to be current-converted at the first voltage/current conversion circuit 5b4, and so the output current IDC1 of the first voltage/current conversion circuit 5b4 is to be given by the following formula (17). Thus this direct feed-back current IDC1 is to flow into the inverse input terminal (−) of the balanced amplifier 4.

$$IDC1 = K3 \cdot \{K2 \cdot (VREF2 - K4 \cdot VREF1) + VOFF2\}/R \qquad (17)$$

Moreover, to the direct input terminal (+) of the balanced amplifier 4, there is to be sent the offset cancel current IDC2 given by the following formula (18).

$$IDC2 = K3 \cdot VREF3/R \qquad (18)$$

When V2 is smaller than VREF2, there is no feed-back to the inverse input terminal (−) from the inverse output terminal $\overline{0}$ of the balanced amplifier 4. Thus, substantially, IDC1 is not a feed-back current. Hence, the loop current IL in case when there is no feed-back is to be given by the following formula (19).

$$IL = \{(IDC1 - IDC2)/2\} \times (R/RF) \qquad (19)$$

Then when formulas (17) and (18) are applied to formula (19), the following formula (20) is to be given.

$$IL = K3 \cdot [\{K2 \cdot VREF2 - K4 \cdot VREF1) + VOFF2\}/2R - VREF3/2R] \times (R/RF) \qquad (20)$$

Here, as described in the case of the constant resistance feeding, since VREF3 equals VOFF2, the following formula (21) is to be given, and thus a constant current feeding is realized.

$$\begin{aligned} IL &= \{K2 \cdot K3 \cdot (VREF2 - K4 \cdot VREF1)/2R\} \times (R/RF) \qquad (21)\\ &= K2 \cdot K3 \cdot (VREF2 - K4 \cdot VREF1)/2RF \end{aligned}$$

Furthermore, by determining K2, K3, K4, VREF2, and VREF1 suitably, the value of the constant current can be set voluntarily.

Similarly to the case of the constant resistance feeding, in this case also, the loop current IL always flows in the direction of the Ring terminal from the Tip terminal since IDC1 is larger than IDC2.

Therefore, in order to reverse feed, the externally-adopted polarity switching relays 11 are to be controlled so as to switch the polarity of the loop current.

Figure 3:
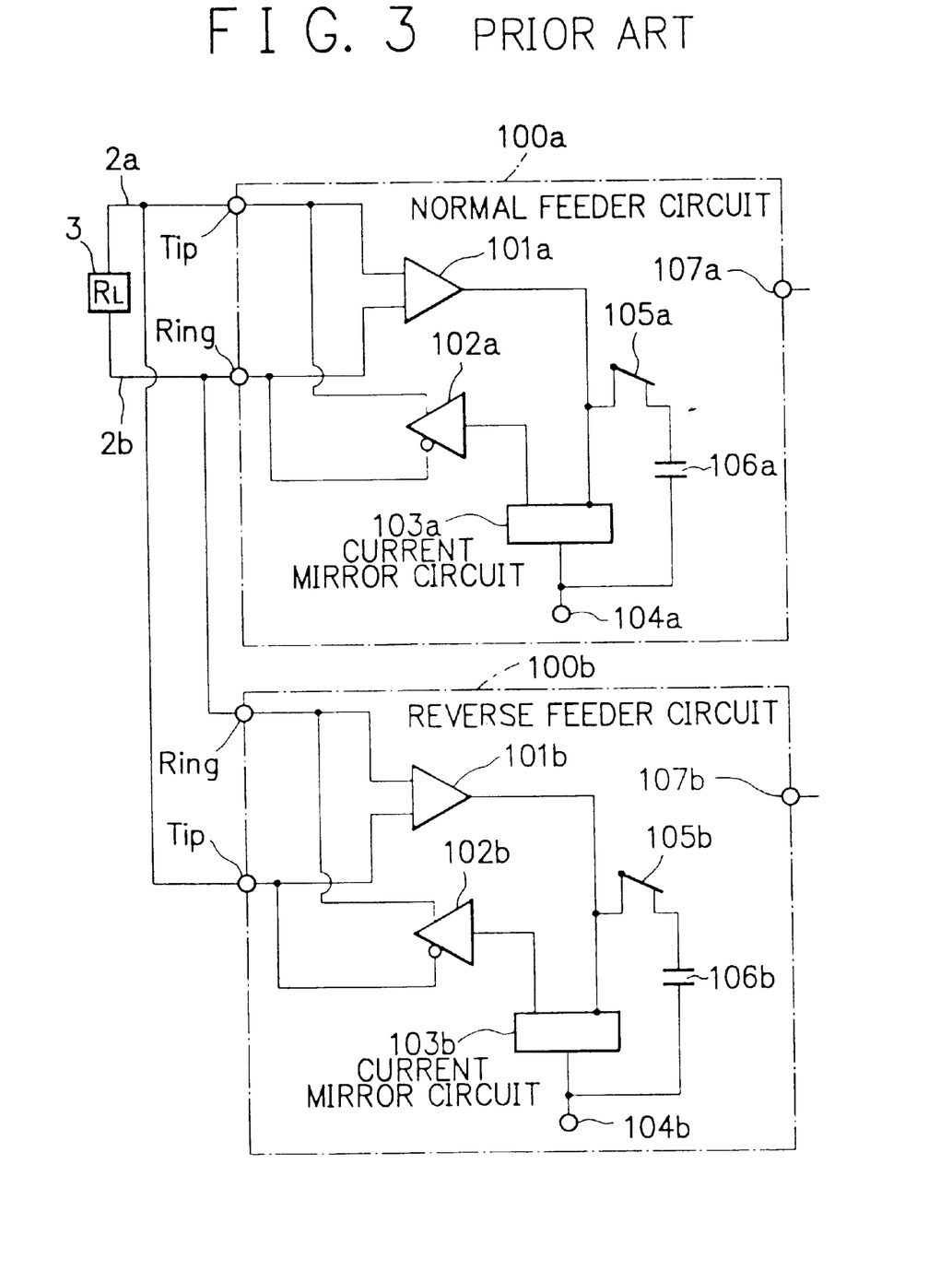
FIG. 3 is a block diagram showing one example of the conventional feeder circuit with a built-in call-current polarity switching circuit.

Next, there will be a description of the direct feeding division of the conventional subscriber circuit with a built-in call-current polarity switching circuit with reference to FIG. 3.

FIG. 3 is a block diagram showing another example of the conventional subscriber circuit with a built-in call-current polarity switching circuit as disclosed in the Japanese Patent Laid-Open Publication No. Sho-61-113354.

In FIG. 3, 2a and 2b are subscriber lines, and 100a and 100b are feeder circuits of which configurations are the same. The feeder circuits 100a and 100b have control terminals 107a and 107b connected respectively with an opposite polarity as against the subscriber lines 2a and 2a. Hereafter, the feeder circuit 100a is to be called a "normal feeder circuit 100a", and the feeder circuit 100b is to be called a "reverse feeder circuit 100b".

The normal feeder circuit 100a comprises a voltage/current conversion circuit 101a of a high-input impedance which detects the subscriber voltage of the subscriber lines 2a and 2b so as to convert the detected voltage into a current. The normal feeder circuit 100a further comprises a common terminal 104a and a current mirror circuit 103a to which the output from the voltage/current conversion circuit 101a is inputted. The normal feeder circuit 100a further comprises a current supply circuit 102a which absorbs the loop current from the subscriber line 2b so as to output the loop current to the subscriber line 2a. Moreover, the normal feeder comprises a switch 105a and a condenser 106a which are connected in series, parallel to the current mirror circuit 103a.

Likewise, the reverse feeder circuit 100a comprises a voltage/current conversion circuit 101b of a high-input impedance which detects the subscriber voltage of the subscriber lines 2a and 2b so as to convert the detected voltage into a current. The reverse feeder circuit 100b further comprises a common terminal 104b and a current mirror circuit 103b to which the output from the voltage/ current conversion circuit 100b is inputted. The reverse feeder circuit 100b further comprises a current supply circuit 102b which absorbs the loop current from the subscriber line 2a so as to output the loop current to the subscriber line 2b. Moreover, the normal feeder comprises a switch 105b and a condenser 106a which are connected in series, parallel to the current mirror circuit 103b.

Next, there will be a description of the operation of the conventional subscriber circuit with the built-in call-current polarity switching circuit.

At the time of normal feeding, the normal feeder circuit 100a is set to be on by an external signal from the control terminal 107a, while the reverse feeder circuit 100b is set to be off by a signal from the control terminal 107b. The loop current is to be sent to the loop resistance 3 from the current supply circuit 102a passing through the subscriber line 2a and then sent back to the same current supply circuit 102a passing through the subscriber line 2b. Here, since the reverse feeder circuit 100b becomes high impedance, as against the subscriber lines 2a and 2b, it shall not have any influence over the operation described as above.

On the other hand, at the time of reverse feeding, the signals from the control terminals 107a and 107b are inverted, and the loop current is to be sent to the loop resistance 3 from the current supply circuit 102b passing through the subscriber line 2b, and then sent back to the subscriber line 2a so as to flow into the same current supply circuit 102b.

Now, there will be an explanation of the problems relating to the conventional subscriber circuit as described above.

As to the first problem, according to the conventional subscriber circuit, the feeder circuit as shown in FIG. 1, has mechanical elements such as the polarity switching relays etc. for switching the polarity of the loop current, which hinders the whole device from becoming more miniaturized as well as electronized.

The cause of the first problem is that the above-mentioned conventional subscriber circuit does not have the call-current polarity switching circuit built inside.

The second problem is that as for the type of conventional subscriber circuit with a built-in call-current polarity switching circuit as shown in FIG. 3, the circuit tends to become large-scale which leads to a difficulty in deterring the increase of costs.

The cause of the second problem is that this conventional subscriber circuit as shown in FIG. 3 needs to double the area for the feeder circuit division, since there are two feeder circuits of the same configuration, one applied at the time of normal feeding and the other applied at the time of reverse feeding. Those two feeder circuits are mutually switched in times of loop current switching.

SUMMARY OF THE INVENTION

Therefore, the present invention is achieved with such points in mind with an object of providing a direct feeder circuit wherein the loop current polarity switching circuit is built in and the scale of the circuit is relatively small so as to fabricate the circuit with low costs.

According to the present invention, in order to accomplish the above-mentioned object, there is provided a subscriber circuit comprising: a balanced amplifier of an input/output differential type having a first and a second input terminals, a first and second output terminals, a first change-over switch, and a loop resistance, the loop resistance being connected in between the first and the second input terminals, one terminal of the first change-over switch being connected to the first output terminal, and the other terminal of the fist change-over switch being connected to the second output terminal; an input stage of the direct feed-back circuit, a fixed terminal of the first change-over switch being connected to the input of the direct feed-back circuit, and a fixed terminal of the second change-over switch being connected to the output of the direct feed-back circuit; an input stage of the offset cancel circuit, a first reference voltage is connected to the input of the offset cancel circuit, and a fixed terminal of a third change-over switch being connected to an output of the offset cancel circuit; an output stage of the direct feed-back circuit, an input of the direct feed-back circuit being interconnected to one terminal of the second change-over switch and one terminal of the third change-over switch, and an output of the direct feed-back circuit being connected to a third input terminal of the balanced amplifier; and an output stage of the offset cancel circuit, an input of the offset cancel circuit being interconnected to the other terminal of the second change-over switch and the other terminal of the third change-over switch, and the output of the offset cancel circuit being connected to a fourth input terminal of the balanced amplifier.

Thus, the present invention is accomplished by the subscriber circuit in which only one feeder circuit is used in switching the loop current polarity.

More specifically, the present invention comprises the output stage circuit of the direct feed-back circuit (e.g., 5b of FIG. 4) and the output stage circuit of the offset cancel circuit (e.g., 6b of FIG. 4); both of which have the same circuit configuration.

According to one aspect of the present invention, the output stage circuit of the direct feed-back circuit and the output stage circuit of the offset cancel circuit have the same circuit configuration, and by switching the signals being inputted to those circuits by switches, the circuit which has been operating as the output stage of the direct feed-back circuit during the normal feeding is to operate as the output stage of the offset cancel circuit during the reverse feeding, and on the other hand, the circuit which has been operating as the output stage of the offset cancel circuit during the normal feeding is to operate as the output stage of the direct feed-back circuit during the reverse feeding. Hence it is possible to switch the loop current without adopting an extra circuit for the reverse feeding.

According to another aspect of the present invention, by making the output stage circuits of the direct feed-back circuit and the offset cancel circuit have the same configuration, it is possible to conduct an offset cancel at one place while conventionally it was conducted at two places. Therefore, the subtracter is no longer necessary.

According to still another aspect of the present invention, since all the circuits which are capable of operating with the +5 system can be constructed with CMOS, the circuit scale can be further minimized.

The above and further objects and the novel feature of the invention will more fully appear form the following detailed description when the same is read in connection with the accompanying drawings. It is to be expressly understood, however, that the drawings are for the purpose of illustration only and are not intended as a definition of the limits of the invention.

DESCRIPTION OF THE PREFERRED EMBODIMENTS

Now, with reference to the drawings, the present invention will be apparent from the following description of the preferred embodiments of the invention.

According to the present invention, as to the preferred state of the embodiment, there is provided a subscriber circuit comprising: a balanced amplifier (indicated as 4 in FIG. 4) of an input/output differential type having first and second input terminals, first and second output terminals, a first change-over switch, and a loop resistance, the loop resistance (indicated as 3 in FIG. 4) being connected in between the first and second input terminals, one terminal (N) of the first change-over switch (also can be simply called as "switch", indicated as 7a in FIG. 4) being connected to a first output terminal, and the other terminal (R) of the fist change-over switch being connected to the second output terminal; an input stage (indicated as 5a in FIG. 4) of the direct feed-back circuit, a fixed terminal of the first change-over switch being connected to an input of the direct feed-back circuit, and a fixed terminal of the second change-over switch (indicated as 7b in FIG. 4) being connected to the output of the direct feed-back circuit; an input stage (indicated as 6a in FIG. 4) of the offset cancel circuit, a first reference voltage (indicated as Vref1 in FIG. 4) being connected to the input of the offset cancel circuit, and a fixed terminal of a third change-over switch (indicated as 7c in FIG. 4) being connected to an output of the offset cancel circuit; an output stage (indicated as 5b in FIG. 4) of the direct feed-back circuit, an input of the direct feed-back circuit being interconnected to one terminal (N) of the second change-over switch (indicated as 7b in FIG. 4) and one terminal (R) of the third change-over switch (indicated as 7c in FIG. 4), and an output of the direct feed-back circuit being connected to a third input terminal of the balanced amplifier (indicated as 4 in FIG. 4); and an output stage (indicated as 6b in FIG. 4) of the offset cancel circuit, an input of the offset cancel circuit being interconnected to the other terminal (R) of the second change-over switch (indicated as 7b in FIG. 4) and the other terminal (N) of the third change-over switch (indicated as 7c in FIG. 4), and the output of the offset cancel circuit being connected to a fourth input terminal of the balanced amplifier.

Furthermore, as to another preferred state of the embodiment according to the present invention, the output stage circuit of the direct feed-back circuit (indicated as 5b in FIG. 4) and the output stage circuit of the offset cancel circuit (indicated as 6b in FIG. 4) are to have the same circuit configuration. Thus by switching the signals being inputted to those circuits by switches, the circuit which has been operating as the output stage of the direct feed-back circuit during the normal feeding is to operate as the output stage of the offset cancel circuit during the reverse feeding. On the other hand, the circuit which has been operating as the output stage of the offset cancel circuit during the normal feeding is to operate as the output stage of the direct feed-back circuit during the reverse feeding. Therefore, it is possible to switch the loop current without adopting an extra circuit for the reverse feeding.

Moreover, as to still another preferred state of the embodiment according to the present invention, the input stage (indicated as 5a in FIG. 5) of the direct feed-back circuit comprises: a first amplifier (indicated as 5a1 in FIG. 5) which multiplies an input voltage by a constant number; a means for adding the first offset voltage (indicated as VOFF1 in FIG. 5) to the output of the first amplifier; and a voltage discrimination circuit (indicated as 5a2 in FIG. 5) which compares the sum of an output voltage of the first amplifier and the first offset voltage (described as V2 in FIG. 5) with a second reference voltage (VREF2) so as to output the same voltage as the higher one of the two input voltage with a low impedance. The output stage of the direct feed-back circuit (indicated as 5b in FIG. 4) comprises: a first low-pass filter (indicated as 5b1 in FIG. 5); a second amplifier (indicated as 5b2 in FIG. 5) which multiplies the output voltage of the first low-pass filter by a constant number; a first adder (indicated as 5b3 in FIG. 5) which adds the output voltage of the second amplifier and the second offset voltage (indicated as VOFF2 in FIG. 2); and a first voltage/curretn conversion circuit (indicated as 5b4 in FIG. 5) for current-converting the output voltage of the first adder.

Furthermore, as to still another preferred state of the embodiment according to the present invention, the input stage of the offset cancel circuit (indicated as 6a in FIG. 4) comprises a third amplifier (indicated as 6a in FIG. 4) which outputs the first reference voltage (VREF1) multiplied by a constant number (K1). Furthermore, an output stage of the offset cancel circuit (indicated as 6b in FIG. 4) comprises: a second low-pass filter (indicated as 6b1 in FIG. 5); a fourth amplifier (indicated as 6b2 in FIG. 5) outputting the output voltage of the second low-pass filter multiplied by a constant number; a second adder (indicated as 6b3 in FIG. 5) adding the output voltage of the fourth amplifier together with the third reference voltage (Vref3); and the second voltage/current conversion circuit (indicated as 6b4 in FIG. 5) current-converting the output voltage of the second adder.

Figure 4:
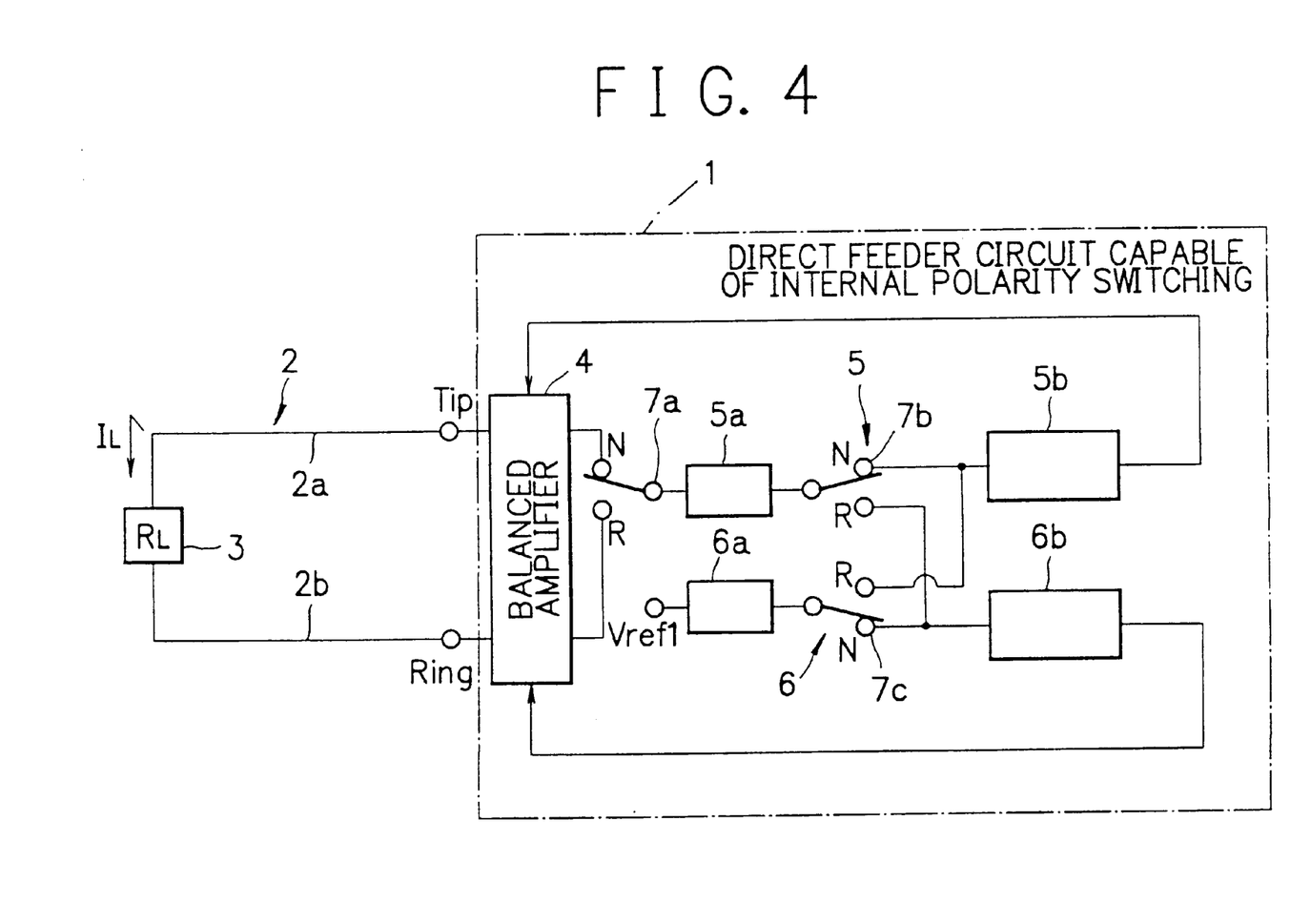
FIG. 4 is a block diagram of one of the embodiments of the present invention.
Figure 5:
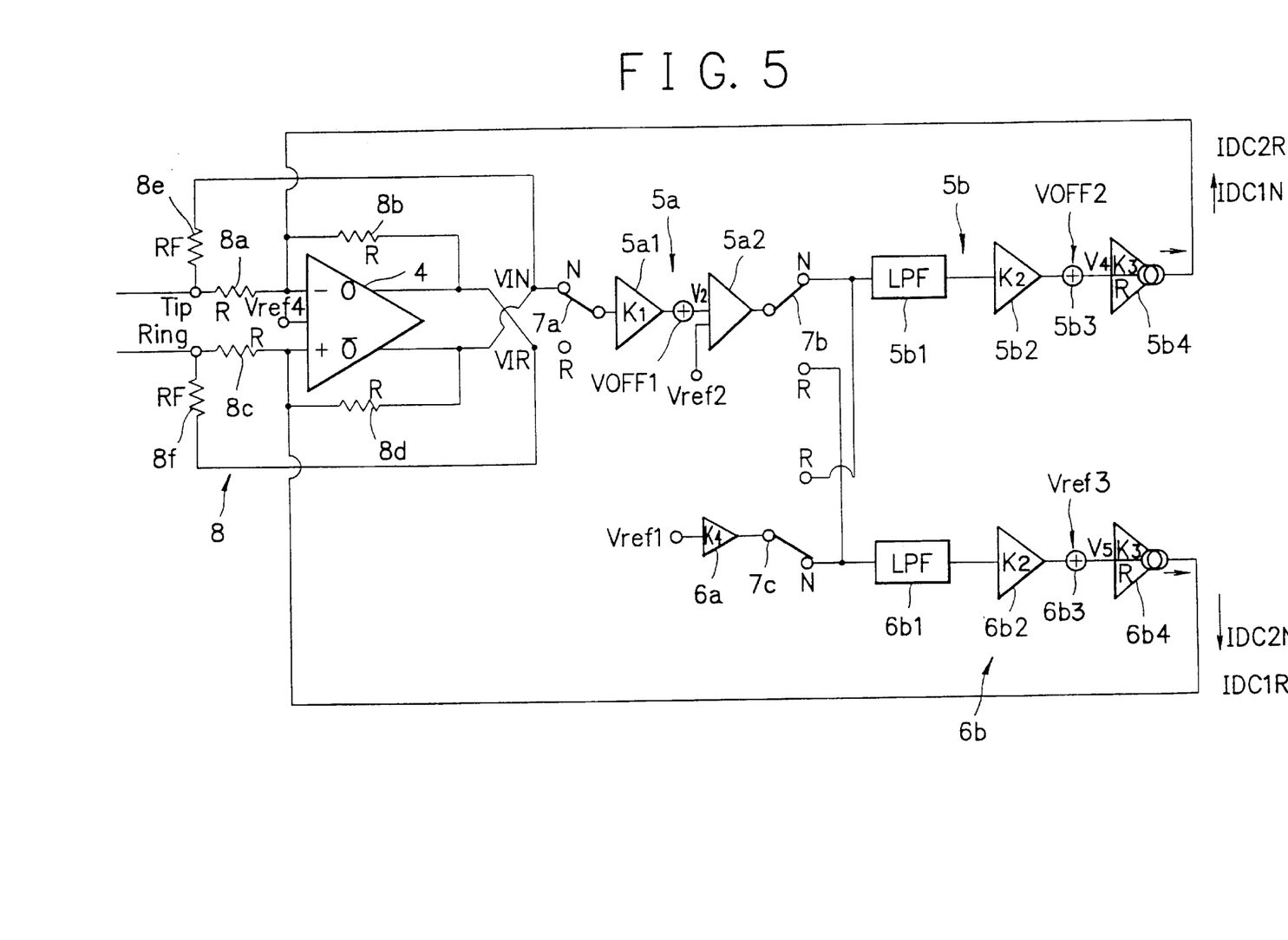
FIG. 5 is a detailed circuit diagram of the circuit shown in FIG. 4.

Next, there will be a description of one of the embodiments of the present invention with reference to FIG. 4 and FIG. 5. FIG. 4 is a block diagram showing the configuration of the embodiment of the present invention, and FIG. 5 is a diagram showing FIG. 4 as a detailed circuit.

According to the present embodiment, when referring to FIG. 4, the balanced amplifier 4 of the input/output differential type has the first terminal connected to the Tip terminal of a two-wire line 2, and the second terminal connected to the Ring terminal of the two-wire line 2.

In between the Tip terminal and the Ring terminal there is connected the loop resistance 3.

The balanced amplifier 4 has the first output terminal connected to one terminal (N) of the first switch 7a, and the second output terminal connected to the other terminal (R) of the first switch 7a.

The third (fixed) terminal of the switch 7a is connected to the input of the input stage 5a of the direct feed-back circuit 5. The output from the input stage 5a of the direct feed-back circuit 5 is connected to the third (fixed) terminal of the second switch 7b.

The first reference voltage VREF1 is connected to the input of the input stage 6a of the offset cancel circuit 6, and the output of the offset cancel circuit 6 is connected to the third (fixed) terminal of the third switch 7c.

One terminal (N) of the second switch 7b is connected to the input of the output stage 5b of the direct feed-back circuit 5 as well as one terminal (R) of the switch 7c. The other terminal (R) of the second switch 7b is connected to the input of the output stage 6b of the offset cancel circuit 6 as well as the other terminal (N) of the third switch 7c.

The output of the output stage 5b of the direct feed-back circuit 5 is to be connected to the third input terminal of the balanced amplifier 4, and the output stage 6b of the offset cancel circuit 6 is to be connected to the fourth input terminal of the balanced amplifier 4.

Next, there will be a detailed description of one example of the configuration of the balanced amplifier 4.

When referring to FIG. 5, the balanced amplifier 4 of an input/outpout differential type comprises a positive (direct) and a negative (inverse) input terminals (+) and (−), and a direct and an inverse output terminals 0 and $\overline{0}$. Each of the direct and the inverse output terminal amplifies a voltage in between the positive (direct) and the negative (inverse) input terminals so as to generate respectively a voltage of a same amplitude but a different polarity around a reference voltage VREF4. In between the inverse output terminal $\overline{0}$ and a Tip terminal, there is connected a resistance 8e, while in between the direct input terminal 0 and a Ring terminal, there is connected a resistance 8f. both of the resistances 8e and 8f have a resistance value RF. The negative (inverse) input terminal (−) and the direct output terminal 0 of the balanced amplifier 4 are subjected to a feed-back from the Tip terminal through resistances 8a and 8b having a resistance value R. Similarly, the positive (direct) input terminal (+) and the inverse output terminal $\overline{0}$ are subjected to a feed-back from the Ring terminal through resistances 8c and 8d having the resistance value R. Thus in the conventional subscriber circuit, there is constructed a unit inverting amplifier.

Next, there will be a detailed description of one example of the configuration of the direct feed-back circuit 5.

This direct feed-back circuit 5 is composed of two stages which are the input stage 5a and the output stage 5b.

First as to the input stage 5a, when referring to FIG. 5, it comprises the first amplifier 5a1 having a gain of K1, and the voltage discrimination circuit 5a2.

To the input terminal of the first amplifier 5a1, the third (fixed) terminal of the above-mentioned switch 7a is connected. The output of the first amplifier 5a1 is added together with the first offset voltage VOFF1.

Accordingly, if the voltage at the input terminal of the first amplifier 5a1 is to be V1, the output voltage V2 of the first amplifier 5a1 is to be given by the following formula (22).

$$V2 = K1 \cdot V1 + VOFF1 \qquad (22)$$

The voltage discrimination circuit 5a2 at the following stage has two direct input terminals which are the first and second direct input terminals of which input voltage of a higher value is to be valid. Then the voltage discrimination circuit 5a2 outputs with a low impedance a voltage having the same value as the valid input voltage inputted either from the first or the second direct input terminal. Therefore the voltage discrimination circuit 5a2 also serves as what is called a buffer amplifier.

To the first direct input terminal of the voltage discrimination circuit 5a2, the output terminal of the first amplifier 5a1 is connected, and to the second direct input terminal of the voltage discrimination circuit 5a2, the second reference voltage VREF2 is connected. Moreover, the output terminal of the voltage discrimination circuit 5a2 is connected to the third (fixed) terminal of the second switch 7b, and outputs either one of the direct input terminal voltage V2 and the second reference voltage VREF2 having the higher voltage.

Second, there will be a detailed description of the output stage 5b of the direct feed-back circuit 5.

When referring to FIG. 5, the output stage 5b of the direct feed-back circuit 5 comprises four blocks, which are the first low-pass filter 5b1, the second amplifier 5b2 having a gain of K2, the first adder 5b3, and the first voltage/curren conversion circuit 5b4 having a voltage/current conversion coefficient K3/R.

To the input of the first low-pass filter 5b1, one terminal (N) of the second switch 7b and one terminal (R) of the third switch 7c are connected. The output of the first low-pass filter 5b1 is connected to the input of the second amplifier 5b2. The output of the second amplifier 5b2 is connected to the first adder 5b3, and the second offset voltage VOFF2 is added here at the first adder 5b3. The output of the first adder 5b3 is connected to the input of the first voltage/current conversion circuit 5b4. The output of the first voltage/current conversion circuit 5b4 is connected to the inverse input terminal (−) of the balanced amplifier 4. Therefore, the output voltage of the first adder 5b3 is to be converted into a current with the voltage/current conversion coefficient K3/R at the first voltage/current conversion circuit 5b4 so as to flow into the inverse input terminal (−) of the balanced amplifier 4.

Next, there will be a description of one example of the configuration of the offset cancel circuit 6.

This offset cancel circuit 6 is composed of two stages which are the input stage 6a and the output stage 6b.

First, as to the input stage 6a, when referring to FIG. 5, it comprises the third amplifier 6a having a gain of K4 wherein the first reference voltage VREF1 is connected to the input terminal, and the output terminal is connected to the third (fixed) terminal of the third switch 7c. From the output terminal of the third amplifier 6a, there is outputted the VREF1 multiplied by K4.

Second, there will be a detailed description of the output stage 6b of the offset cancel circuit 6.

When referring to FIG. 5, the output stage 6b of the offset cancel circuit 6 comprises four blocks, which are the second low-pass filter 6b1, the fourth amplifier 6b2 having a gain of K2, the second adder 6b3, and the second voltage/current conversion circuit 6b4 having a voltage/current conversion coefficient K3/R.

To the input of the second low-pass filter 6b1, the other terminal (R) of the second switch 7b and the other terminal (N) of the third switch 7c are connected. The output of the second low-pass filter 6b1 is connected to the input of the fourth amplifier 6b2. The output of the fourth amplifier 6b2 is connected to the second adder 6b3, and the third offset voltage VOFF3 is to be added here at the second adder 6b3. The output of the second adder 6b3 is connected to the input of the second voltage/current conversion circuit 6b4. The output of the second voltage/current conversion circuit 6b4 is connected to the direct input terminal (+) of the balanced amplifier 4. Therefore, the output voltage from the second adder 6b3 is to be converted into a current with the voltage/current conversion coefficient K3/R at the second voltage/current conversion circuit 6b4 so as to flow into the direct input terminal (+) of the balanced amplifier 4.

Hence, described as above, the output stage 5b of the direct feed-back circuit 5 and the output stage 6b of the offset cancel circuit 6 have the same circuit configuration.

Thus by arranging the output stage 5b of the direct feed-back circuit 5 and the output stage 6b of the offset cancel circuit 6 to have the same circuit configuration, it is possible to have the circuit of 5b to operate as the output stage of the direct feed-back circuit 5, and the circuit of 6b to operate as the output stage of the offset cancel circuit 6 during the normal feeding. as well as to have the circuit of 5b to operate as the output stage of the offset cancel circuit 6, and the circuit of 6b to operate as the output stage of the direct feed-back circuit 5 during the reverse feeding.

Next, there will be a description of the operation of the circuit shown in FIGS. 4 and 5.

First, there will be a description of the operation of the circuit at the time of normal feeding.

At the time of normal feeding, all the switches 7 are to close to the side indicated by the code N due to the external control signals. That is to say, the switches are controled in the following manner; the first switch 7a has one terminal (N) and the third (fixed) terminal closed and the other terminal (R) opened, the second switch 7b has the third (fixed) terminal and one terminal (N) closed and the other terminal (R) opened, and the third switch 7c has the third (fixed) terminal and the other terminal (N) closed and one terminal (R) opened.

When it is assumed that the inverse output voltage from the balanced amplifier 4 is V1N, this voltage V1N is to be multiplied by K1 at the first amplifier 5a1, and added together with the first offset voltage VOFF1 at the output of the first amplifier 5a1. Accordingly, the output voltage V2 of the first amplifier 5a1 is to be given by the following formula (23).

$$V2 = K1 \cdot V1N + VOFF1 \qquad (23)$$

Then the output voltage V2 of the first amplifier 5a1 and the second reference voltage VREF2 are to be compared at the input terminal of the following voltage discrimination circuit 5a2.

Now, when it is assumed that V2 is larger than VREF2, the voltage discrimination circuit 5a2 outputs the output voltage V2 which is to be inputted to the first low-pass filter through the second switch 7b.

The third amplifier 6a has the first reference voltage VREF1 inputted and outputs an output voltage K4·VREF1 to the second low-pass filter through the third switch 7c.

As for the conventional subscriber circuit shown in FIG. 2, there is conducted a subtraction between the output of the voltage discrimination circuit 5a2 and the output of the third amplifier 6a at the subtracter 10 so as to cancel the offset voltage. However, as to the present embodiment, the offset cancel is not conducted at this place but at the input terminals of the balanced amplifier 4. Therefore, according to the present invention, the subtraction amplifier which is required in the conventional subscriber circuit can be omitted.

The output voltage V2 of the voltage discrimination circuit 5a2 is to have an AC component being eliminated by passing through the first low-pass filter 5b1, and inputted to the second amplifier 5b2 having a gain of K2. Then the output voltage of the second amplifier is to become K2·V2 to which the second offset voltage VOFF2 is added at the following first adder 5b3. Here, when it is assumed that the output voltage of the first adder 5b3 is V4, this V4 is to be given by the following formula (24).

$$V4 = K2 \cdot V2 + VOFF2 \quad (24)$$
$$= K2 \cdot (K1 \cdot V1N + VOFF1) + VOFF2$$

This voltage V4 is to be inputted to the first voltage/current conversion circuit 5b4 having the voltage/current conversion coefficient of K3/R, so as to become a current IDC1N which is fed back to the inverse input terminal (−) of the balanced amplifier 4. Here, the output current IDC1N of the first voltage/current conversion circuit 5b4 is to be given by the following formula (25).

$$IDC1N = K3 \cdot \{K2 \cdot (K1 \cdot V1N + VOFF1) + VOFF2\}/R \quad (25)$$

The output voltage K4·VREF1 of the third amplifier 6a is to have an AC component being eliminated by passing through the second low-pass filter 6b1, and inputted to the fourth amplifier 6b2 having a gain of K2 times. Then the output voltage of the fourth amplifier 6b2 is to become K2·(K4·VREF1) to which the third offset voltage VOFF3 is added at the following second adder 6b3. Here, when it is assumed that the output voltage of the second adder 6b3 is V5, this V5 is to be given by the following formula (26).

$$V5 = K2 \cdot (K4 \cdot VREF1) + VREF3 \quad (26)$$

This voltage V5 is to be inputted to the second voltage/current conversion circuit 6b4 having the voltage/current conversion coefficient of K3/R, so as to become a current IDC2N which is to flow into the direct input terminal (+) of the balanced amplifier 4. Here, the output current IDC2N of the second voltage/current conversion circuit 6b4 is to be given by the following formula (27).

$$IDC2N = K3 \cdot \{K2 \cdot (K4 \cdot VREF1) + VREF3\}/R \quad (27)$$

Now, a loop current IL flowing to the loop resistance 3 is to be looked for. Here, a voltage of the Tip terminal is to be VTip.

When the current IDC1N is feed-backed to the inverse input terminal (−) of the balanced amplifier 4, and the current IDC2N is being sent to the direct input terminal (+) of the balanced amplifier 4, the following formula (28) is to be given.

$$V1N = VTip + IDC1N \times (R/2) - IDC2N \times (R/2) \quad (28)$$

At this point, when formulas (26) and (27) are applied to formula (28), the following formula (29) is to be given.

$$V1N = VTip + K3 \cdot [\{K2 \cdot (K1 \cdot V1N + VOFF1) + VOFF2\}/R] \times (R/2) - K3 \cdot [\{K2 \cdot (K4 \cdot VREF1) + VREF3\}/R] \times (R/2) \quad (29)$$

Here, the offset voltages VOFF1 and VOFF2 are canceled by setting K4·VREF1 so that it would equal to VOFF1, and setting VREF3 so that it would equal to VOFF2. Accordingly, the following formula (30) is to be given.

$$V1N = VTip + (K1 \cdot K2 \cdot K3 \cdot V1N)/2 \quad (30)$$

When this formula is to be solved for V1N, the following formula (31) is to be given.

$$V1N = 2 \cdot VTip/(2 - K1 \cdot K2 \cdot K3) \quad (31)$$

Furthermore, the loop current IL is to be given by the following formula (32).

$$IL = (V1N - VTip)/RF \quad (32)$$

When formula (31) is applied to formula (32), the following formula (33) is to be given.

$$IL = VTip \cdot \{2/(2 - K1 \cdot K2 \cdot K3) - 1\}/RF \quad (33)$$

Here, there is provided the following formula (34).

$$\{1 - 2/(2 - K1 \cdot K2 \cdot K3)\}/RF = 1/RDC \quad (34)$$

Then the following formula (35) is to be given which indicates that a constant resistance feeding is being realized in the same way as the conventional system.

$$IL = -VTip/RDC \quad (35)$$

It is possible to set the feed resistance RDC voluntarily by altering gains K1 and K2 of the first and the second amplifiers 5a1 and 5a2, and gain K3 of the first voltage/current conversion circuit 5b4.

Furthermore, the loop current IL in case where VREF2 is larger than V2 is to be acquired by the same steps as above.

The direct feed-back current IDC1N is to be given by the following formula (36).

$$IDC1N = K3 \cdot (K2 \cdot VREF2 + VOFF2)/R \quad (36)$$

The offset cancel current IDC2N is to be given by the following formula (37).

$$IDC2N = K3 \cdot \{K2 \cdot (K4 \cdot VREF1) + VREF3\}/R \quad (37)$$

Here, the loop current IL in case when VREF2 is larger than V2 is to be acquired by the following formula (38).

$$IL = \{(IDC1 - IDC2)/2\} \times (R/RF) \quad (38)$$

When applying formulas (36) and (37) to formula (38), the loop current IL is to be given by the following formula (39), and so the constant current feeding is realized.

$$IL = K2 \cdot K3 \cdot (VREF2 - K4 \cdot VREF1)/2RF \quad (39)$$

Second, a description of the reverse feeding will be given.

The reverse feeding is realized by switching the input point of the direct feed-back current and the offset cancel current flowing into the balanced amplifier 4 at the time of normal feeding. In other words, the direct feed-back current is to flow into the direct input terminal (+) of the balanced amplifier 4, and the offset cancel current is to flow into the inverse input terminal (−) of the balanced amplifier 4.

According to the present embodiment, the reverse feeding is realized by closing all the switches 7 to the side of R by the external signals (not shown). that is to say, the direct output terminal voltage V1R of the balanced amplifier 4 is to be feed-backed to the direct input terminal (+) of the balanced amplifier 4 as a direct feed-back current passing through the input stage 5a of the direct feed-back circuit 5 and the output stage 6b of the offset cancel circuit 6. Moreover, the first reference voltage VREF1 for offsetting the first offset voltage VOFF1 is to flow into the inverse input terminal (−) of the balanced amplifier 4 as an offset cancel current passing through the input stage 6a of the offset cancel circuit 6 and the output stage 5b of the direct feed-back circuit 5.

Since the output stage of 5b of the direct feed-back circuit 5 and the output stage 6b of the offset cancel circuit 6 have the same configuration, the only difference as compared with the case of normal feeding is that the current input points at the balanced amplifier 4 are switched, and all the rest are the same.

First of all, the loop current IL in case when V2 is larger than VREF2 will be acquired. As to the operation, however, since it is almost the same as in the case of normal feeding, only a brief description will be given.

The direct output terminal V1R of the balanced amplifier 4 is to be processed respectively at the first amplifier 5a1, the voltage discrimination circuit 5a2, the second low-pass filter 6b1, the fourth amplifier 6b2, and the second adder 6b3. Then the processed direct output terminal voltage V1R of the balanced amplifier 4 is to be converted into the direct feed-back current IDC1R at the second voltage/current conversion circuit 6b4 so as to be feed-backed to the direct input terminal (+) of the balanced amplifier 4. Accordingly, the direct feed-back current IDC1R is to be given by the following formula (40).

$$IDC1R = K3 \cdot \{K2 \cdot (K1 \cdot V1R + VOFF1) + VOFF2\}/R \qquad (40)$$

Furthermore, the first reference voltage VREF1 is to be processed respectively at the third amplifier 6a, the first low-pass filter 5b1, the second amplifier 5b2, and the first adder 5b3. Then the processed first reference voltage VREF1 is to be converted into the offset cancel current IDC2R at the first voltage/current conversion circuit 5b4 so as to flow into the inverse input terminal (−) of the balanced amplifier 4. Then, the offset cancel current IDC2R is to be given by the following formula (41).

$$IDC2R = K3 \cdot \{K2 \cdot (K4 \cdot VREF1) + VREF3\}/R \qquad (41)$$

Now, the loop current IL is to be acquired in case when the voltage at the Ring terminal is VRing. If it is considered in the same manner as the normal feeding, the following formula (42) is to be given.

$$V1R = VRing + IDC1R \times (R/2) - IDC2R \times (R/2) \qquad (42)$$

When applying formulas (40) and (41) to formula (42), and rearrange it, the following formula is (43) is to be provided.

$$V1R = 2 \cdot VRing/(2 - K1 \cdot K2 \cdot K3) \qquad (43)$$

The loop current IL is to be given by the following formula (44)

$$IL = (F1R - VRing)/RF \qquad (44)$$

Then when applying formula (43) to formula (44), the following formula (45) will be given.

$$IL = VRing \cdot \{2/(2 - K1 \cdot K2 \cdot K3) - 1\}/RF \qquad (45)$$

Here, the following formula (46) is provided.

$$\{1 - 2/(2 - K1 \cdot K2 \cdot K3)\}/RF = 1/RDC \qquad (46)$$

Accordingly, the following formula (47) is to be given, which indicates that the constant resistance feeding is realized even in the case of reverse feeding.

$$IL = -VRing/RDC \qquad (47)$$

When comparing formula (47) and (35), the only difference between the two is that while formula (47) has VTip, formula (35) has VRing. Since IDC1R is always larger than IDC2R, the loop current IL will flow in the direction of the Tip terminal form the Ring terminal. Therefore, in terms of potential, the Tip terminal voltage at the time of normal feeding is equivalent to the Ring terminal voltage at the time of reverse feeding, and the Ring terminal voltage at the time of normal feeding is equivalent to the Tip terminal voltage at the time of reverse feeding. Thus, it is obvious that formula (47) and formula (35) are equivalent.

Now, the loop current IL in case when VREF2 is larger than V2 is to be acquired. If it is considered in the same manner as the normal feeding, the direct feed-back current IDC1R is to be given by the following formula (48).

$$IDC1R = K3 \cdot (K2 \cdot VREF2 + VREF3)/R \qquad (48)$$

Then the offset cancel current IDC2R is to be given by the following formula (49).

$$IDC2R = K3 \cdot \{K2 \cdot (K4 \cdot VREF1) + VOFF2\}/R \qquad (49)$$

Here, when VREF2 is larger than V2, the loop current IL is to be given by the following formula (50).

$$IL = \{(IDC1R - IDC2R)/2\} \times (R/RF) \qquad (50)$$

When applying formulas (48) and (49) to formula (50), and rearrange it, the loop current IL is to be given by the following formula (51), which indicates that the constant current feeding is realized even in the case of reverse feeding.

$$IL = K2 \cdot K3 \cdot (VREF2 - K4 \cdot VREF1)/2RF \qquad (51)$$

Figure 6:
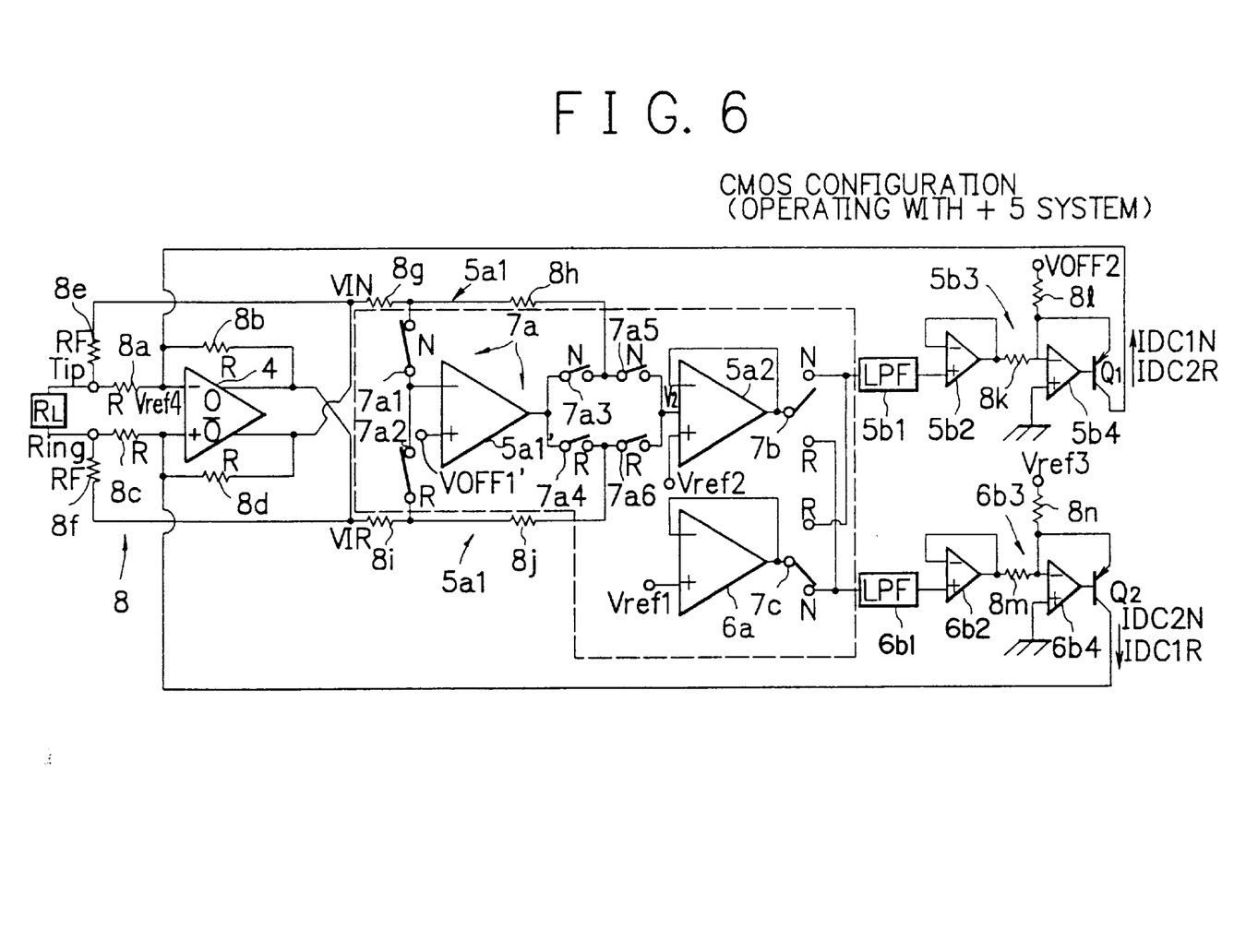
FIG. 6 is a detailed circuit diagram illustrating the circuit shown in FIG. 5 in a more specific way.

Next, there will be a detailed description of the present embodiment with reference to FIG. 6.

FIG. 6 is a diagram illustrating the circuit configuration of one of the embodiments of the present invention shown in FIG. 4 in a more specific way.

Here, as to the part which is already being described above will be omitted.

First, as to the first amplifier 5a1, the inverse output terminal $\overline{0}$ of the balanced amplifier 4 is connected to one terminal of a resistance 8g, and the other terminal of a resistance 8g is connected both to one terminal of a resistance 8h and one terminal of a switch 7a1.

The other terminal of the switch 7a1 is connected both to an inverse input terminal of the amplifier 5a1' and one terminal of a switch 7a2.

The direct output terminal 0 of the balanced amplifier 4 is connected to one terminal of a resistance 8i, and the other terminal of the resistance 8i is connected both to the other terminal of the switch 7a2 and one terminal of a resistance 8j.

An output terminal of the amplifier 5a1' is connected both to one terminal of a switch 7a3 and one terminal of a switch 7a4.

The other terminal of the switch 7a3 is connected both to the other terminal of the resistance 8h and one terminal of a switch 7a5. The other terminal of the switch 7a4 is connected both to the other terminal of the resistance 8j and one terminal of a switch 7a6.

The other terminals of the switches 7a5 and 7a6 are connected to each other, and also connected to the first direct input terminal of the voltage discrimination circuit 5a2.

To the direct input terminal of the amplifier 5a1', an offset voltage VOFF1' is inputted. According to the previously described embodiment, it was explained that the first offset voltage VOFF1 is to be added at the output of the first, amplifier 5a1, however, as to the present embodiment, VOFF1' is to be inputted to the direct input terminal of the amplifier 5a1' Though in this case, it should be inevitable that the following formula (52) is effective.

$$VOFF1 = (1+K1) \cdot VOFF1' \quad (52)$$

The first amplifier 5a1 operates as an inverse amplifier having a gain of K1 on the condition that it is constructed in the above-mentioned manner, and the relation of the resistances 8g, 8h, 8i, and 8j are as follows: $8g:8h=8h:8j=K1$.

Accordingly, at the time of normal feeding, the switches 7a1, 7a3, 7a5 are closed, and the first amplifier 5a1 is to determine the inverse output voltage V1N of the balanced amplifier 4 as an input so as to output the output voltage given by the following formula (53) to the first direct input terminal of the voltage discrimination circuit 5a2.

$$V2 = -K1 \cdot V1N + VOFF1 \quad (53)$$

At the time of reverse feeding, however, the switches 7a2, 7a4, and 7a6 are closed, and the fist amplifier 5a1 is to determine the inverse output voltage V1R of the balanced amplifier 4 as an input so as to output the output voltage given by the following formula (54) to the first direct input terminal of the voltage discrimination circuit 5a2.

$$V2 = -K1 \cdot V1R + VOFF1 \quad (54)$$

Here, the negative code placed before K1 in formulas (53) and (54) indicates that V1N and V1R are inverted.

At this first amplifier 5a1, the output voltage of the balanced amplifier 4 which has been operating with the −48 system is to be level-shifted to the +5 system. Therefore, the first amplifier 5a1 can operate as an attenuator. For example, K1 can be set to ⅙ or the like. Thus, by level-shifting the first amplifier 5a1, the part of the circuit which is circled with a dotted line as shown in FIG. 6 is to operate with the +5 system.

Consequently, by constructing the circuit with CMOS, it is possible to minimize the circuit scale to a considerable extent.

Next, as to the third amplifier 6a having a gain of K4, according to the preset embodiment, it is constructed as a voltage follower circuit wherein K4=1.

Likewise, the second and the fourth amplifiers 5b2, and 6b2 having a gain of K2 are constructed as voltage follower circuits.

As for the first and the second adders 5b3 and 6b3, the input terminal of the voltage/current conversion circuit 5b4 serves as the first adder 5b3, and the input terminal of the voltage/current conversion circuit 6b4 serves as the second adder 6b3.

More concretely, the subscriber circuit of the present invention is to take the following configuration. However, since the output stage 5b of the direct feed-back circuit 5 and the output stage 6b of the offset cancel circuit 6 have the same configuration, the description for the both circuits are to be given at the same time. The brackets indicate the components of the offset cancel circuit 6.

The output terminal of the second (fourth) amplifier 5b2 (6b2) is connected to one terminal of a resistance 8k (8m) and the other terminal of the resistance 8k (8m) is connected to the inverse input terminal of the first (second) voltage/current conversion circuit 5b4 (6b4), one terminal of the resistance 8l (8n) and an emitter terminal of a transistor Q1 (Q2). To the other terminal of a resistance 8l(8n), the second offset voltage VOFF2 (the third reference voltage VREF3) is connected.

The direct input terminal of the voltage/current conversion circuit 5b4 (6b4) are being grounded.

The output terminal of the voltage/current conversion circuit 5b4 (6b4) is connected to a base terminal of the transistor Q1 (Q2), and a collector terminal of the transistor Q1 (Q2) is connected to the inverse input terminal (−) (direct input terminal (+)) of the balanced amplifier 4.

The output voltage of the second amplifier 5b2 is current-converted at the resistance 8k and the offset voltage VOFF2 is current-converted at the resistance 8l, so as to be added together at the inverse input terminal of the first voltage/current conversion circuit 5b4 to become current IDC1N or IDC2R, and flow into the inverse input terminal of the balanced amplifier 4.

Likewise, the output voltage of the fourth amplifier 6b2 is current-converted at the resistance 8m and the third reference voltage VREF3 is current-converted at the resistance 8n, so as to be added together at the inverse input terminal of the second voltage/current conversion circuit 6b4 to become current IDC2N or IDC1R, and flow into the direct input terminal of the balanced amplifier 4.

Here, by setting the resistance value of the resistances 8k and 8m to R/K3, a gain K3 is realized. (R is a value of feed-back resistances 8b and 8d of the balance amplifier 4).

Next, actual numbers are to be used in describing the operation concretely. For example, the condition in which the following codes are to be substituted with the following numbers or codes is to be applied: K1=⅙, K2=K4=1, K3=4, VOFF1=0.9 V, VREF1=0.9 V, VREF2=1.9 V, VOFF2= VREF3, resistance 8l=resistance 8n, RF=50Ω.

First, the loop current IL in case of constant resistance feeding at the time of normal feeding is to be considered (i.e. when V2 is larger than VREF2). Actually, the Tip terminal voltage can not be acquired unless the power source voltage and the loop resistance are obvious. However, if VTip=−4 V, the loop current IL is to be given by the following formula (55) on the basis of formula (33).

$$IL = VTip \cdot \{2/(2-K1 \cdot K2 \cdot K3) - 1\}/RF \quad (55)$$
$$= (-4) \cdot [2/\{2-(-1/6) \cdot 1 \cdot 4\} - 1]/50$$
$$= 20 \text{ mA}$$

Here, the negative code placed before the substitution for K1, indicates inverse. Moreover, the direct current feed resistance RDC is to be given by the following formula (56) on the basis of formula (34), and so a feed of 200 ohm is to be recognized.

$$RDC = RF/\{1 - 2/(2 - K1 \cdot K2 \cdot K3)\} \quad (56)$$
$$= 50/[1 - 2/\{2-(-1/6) \cdot 1 \cdot 4\}$$
$$= 200 \text{ Ω}$$

Now, it is to be described that the part of the circuit circled with a dotted line in FIG. 6 can be constructed with CMOS. When it is to be considered that VTip=−4 V, the inverse output terminal voltage V1N of the balanced amplifier 4 is to become V1N=−3 V according to formula (31).

Thus, output voltage V2 of the first amplifier 5*a*1 is to be given by the following formula (57) on the basis of formula (54).

$$V2 = -(1/6) \times (-3) + 0.9 = 1.4V \quad (57)$$

Moreover, the direct input terminal voltage VOFF1' of the first amplifier 5*a*1 is to be given by the following formula (58) on the basis of formula (52).

$$VOFF1' = VOFF1/(1 + K1) \quad (58)$$
$$= 0.9/(7/6)$$
$$= 0.77 \text{ V}$$

Therefore, it becomes clear that by multiplying the output voltage of the balanced amplifier 4 by K1 (in this case by 1/6), the input voltage V2 of the first amplifier 5*a*1 is to have a voltage of a value within the range of 0 V and 5 V.

Furthermore, since V2 and VREF1 are to have a voltage of a value within the range of 0 V and 5 V, and the third amplifier 6*a* is to operate as a follower of a gain of one times, the voltage discrimination circuit 5*a*2, the third amplifier 6*a*, and all the switches 7 are to be capable of operating with the +5 system.

Thus, concerning such points as described above, the first amplifier 5*a*1, the voltage discrimination circuit 5*a*2, the third amplifier 6*a*, and all the switches 7, all of which are within the dotted box of FIG. 6, are capable of being constructed with CMOS, for they are all able to operate with the +5 system.

Second, the loop current IL in case of constant current feeding at the time of normal feeding is to be considered (i.e. when V2 is smaller than VREF2). In this case, the loop current IL is to be given by the following formula (59) on the basis of formula (39).

$$IL = K2 \cdot K3 \cdot (VREF2 - K4 \cdot VREF1)/2RF \quad (59)$$
$$= 1 \times 4 \times (1.9 - 1 \times 0.9)/(2 \times 50)$$
$$= 40 \text{ mA}$$

Likewise, the loop current IL at the time of reverse feeding is to be considered in the same manner.

When it is assumed that VRing=−4 V, the loop current IL in case of constant resistance feeding at the time of reverse current feeding (i.e. when V2 is larger than VREF2) is to be given by the following formula (60) on the basis of formula (45).

$$IL = VRing \cdot \{2/(2 - K1 \cdot K2 \cdot K3) - 1\}/RF \quad (60)$$
$$= (-4) \cdot [2/\{2 - (-1/6) \cdot 1 \cdot 4\} - 1]/50$$
$$= 20 \text{ mA}$$

Since the feed resistance RDC at the time of reverse feeding is the same as the one at the time of normal feeding, the description will be omitted.

Furthermore, the loop current IL in case of constant current feeding at the time of reverse feeding (i.e. when V2 is larger then VREF2) is to be given by the following formula (61) on the basis of formula (51).

$$IL = K2 \cdot K3 \cdot (VREF2 - K4 \cdot VREF1)/2RF \quad (61)$$
$$= 1 \times 4 \times (1.9 - 1 \times 0.9)/(2 \times 50)$$
$$= 40 \text{ mA}$$

Concerning such points as described above, it becomes clear that by applying the present invention, the constant resistance feeding and the constant current feeding are made possible at the time of both the normal feeding and the reverse feeding.

Figure 7:
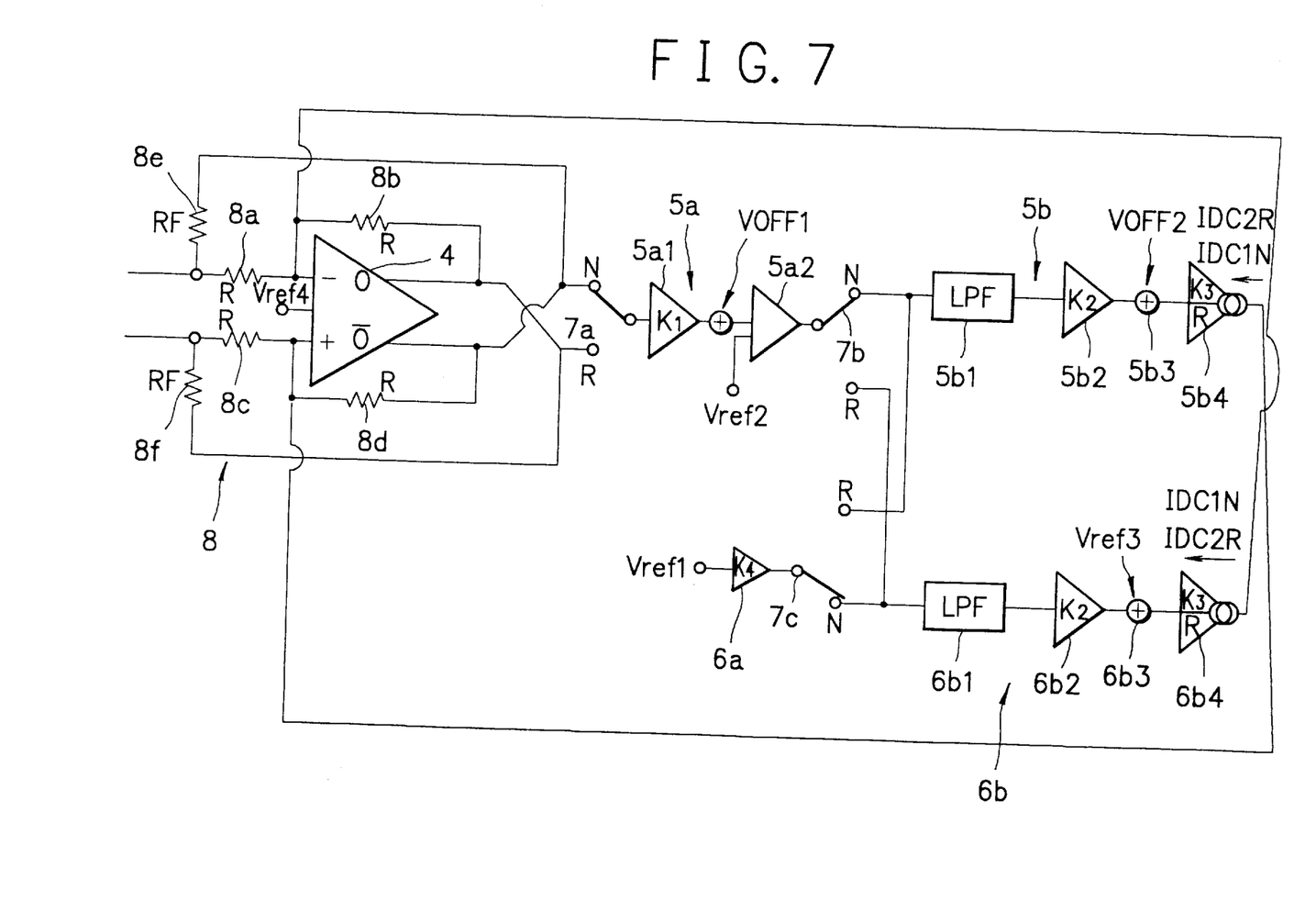
FIG. 7 is a circuit diagram of the second embodiment of the present invention.

Next, there will be a detailed description of a second embodiment of the present invention with reference to FIG. 7. FIG. 7 is a diagram showing the second embodiment of the present invention. In this case, to avoid repetition, only the differences between the first embodiment will be described.

When referring to FIG. 7, there is applied a voltage/current conversion circuit of a current suction type to the first and the second voltage/current conversion circuits 5*b*4 and 6*b*4. Contrary to the conventional examples, due to the nature of the balanced amplifier 4, when the current flowing out from the inverse input terminal (−) of the balanced amplifier 4 is smaller than the current flowing out from the direct input terminal (+) of the balanced amplifier 4, the loop current IL flows in the direction of the Ring terminal from the Tip terminal; and in case when the current flowing out from the inverse input terminal (−) of the balanced amplifier 4 is larger than the. current flowing out from the direct input terminal (+) of the balanced amplifier 4, the loop current IL flows in the direction of the Tip terminal form the Ring terminal. According to the present embodiment, since the direct feeding current IDC1 is always larger than the offset cancel current IDC2 whether at the time of normal feeding or reverse feeding. Therefore, in case when the voltage/current conversion circuit of the current suction type as being applied to the second embodiment is used, it is possible to construct a system in which the voltage/current conversion circuit is applied by connecting the output of the voltage/current conversion circuit to the balanced amplifier 4 in the reverse order of the first embodiment.

The description of the loop current IL in cases of the constant resistance feeding and the constant current feeding will be omitted since it is the same as the one in the first embodiment.

Accordingly, as it has been described, the following effect and advantages are achieved according to the present invention.

The first effect of the present invention is that the whole device is made possible to be more miniaturized as well as electronicized since there is no need for adopting the external polarity switching relays for switching the polarity of the loop current.

The reason for the first effect is that the subscriber circuit according to the present invention has the call-current polarity switching circuit built inside.

The second effect of the present invention is that the subscriber circuit according to the present invention can have the call-current polarity switching circuit built inside with almost the same circuit scale as the conventional subscriber circuit having the external polarity switching relays for switching the polarity of the loop current.

One reason for the second effect is that it has been made possible to switch the loop current without adopting an extra circuit for the reverse feeding, due to the fact that the output stage circuit of the direct feed-back circuit and the output stage circuit of the offset cancel circuit are made to have the same circuit configuration which causes the circuit operating as the output stage of the direct feed-back circuit during the normal feeding to operate as the output stage of the offset cancel circuit during the reverse feeding, and on the other hand, the circuit operating as the output stage of the offset cancel circuit during the normal feeding to operate as the output stage of the direct feed-back circuit during the reverse feeding. Another reason for the second effect is that it has been made unnecessary to adopt the subtracter due to making the output stage circuits of the direct feed-back circuit and the offset cancel circuit have the same configuration which enables the subscriber circuit to conduct an offset cancel at one place while conventionally it was conducted at two places. Another reason for the second effect is that the circuit scale was made possible to be further minimized due to the fact that all the circuits which are capable of operating with the +5 system are constructed with CMOS.

While preferred embodiments of the invention have been described using specific terms, such description is for illustrative purposes only, and it is to be understood that changes and variations may be made without departing from the spirit or scope of the following claims.

What is claimed is:

1. A subscriber circuit comprising:
    a balanced amplifier of an input/output differential type having first, second, third, and fourth input terminals, and first and second output terminals;
    a first change-over switch having a first terminal connected to the first output terminal of the balanced amplifier and a second terminal connected to the second output terminal of the balanced amplifier;
    a loop resistance, the loop resistance being connected between the first and the second input terminals of the balanced amplifier;
    a direct feed-back circuit having input and output stages and a second change-over switch, a third terminal of first change-over switch being connected to an input of the input stage of the direct feed-back circuit, and a first terminal of the second change-over switch being connected to an output of the input stage of the direct feed-back circuit; and
    an offset cancel circuit having input and output stages and a third change-over switch, a first reference voltage being connected to an input of the input stage of the offset cancel circuit, and a first terminal of the third change-over switch being connected to an output of the input stage of the offset cancel circuit;
    wherein an input of the output stage of the direct feed-back circuit is connected to a second terminal of the second change-over switch and a second terminal of the third change-over switch, and an output of the output stage of the direct feed-back circuit is connected to the third input terminal of the balanced amplifier; and
    wherein an input of the output stage of the offset cancel circuit is connected to a third terminal of the second change-over switch and a third terminal of the third change-over switch, and an output of the output stage of the offset cancel circuit is connected to the fourth input terminal of the balanced amplifier.

2. A subscriber circuit according to claim 1, wherein the input stage of the direct feed-back circuit comprises:
    a first amplifier which multiplies an input voltage by a constant number to produce an output voltage;
    means for adding a first offset voltage to the output voltage of the first amplifier to produce a voltage sum; and
    a voltage discrimination circuit which compares the voltage sum with a second reference voltage so as to output a higher voltage of the voltage sum and the second reference voltage.

3. A subscriber circuit according to claim 2, wherein the output stage of the direct feed-back circuit comprises:
    a first low-pass filter;
    a second amplifier which multiplies an output voltage of the first low-pass filter by a constant number;
    a first adder which adds an output voltage of the second amplifier and a second offset voltage; and
    a first voltage/current conversion circuit for current-converting an output voltage of the first adder.

4. A subscriber circuit according to claim 3, wherein the input stage of the offset cancel circuit comprises a third amplifier which outputs the first reference voltage multiplied by a constant number.

5. A subscriber circuit according to claim 4, wherein the output stage of the offset cancel circuit comprises:
    a second low-pass filter;
    a fourth amplifier which outputs an output voltage of the second low-pass filter multiplied by a constant number;
    a second adder which adds an output voltage of the fourth amplifier together with a third reference voltage; and
    a second voltage/current conversion circuit which current-converts an output voltage of the second adder.

6. A subscriber circuit according to claim 1, wherein the input stage of the direct feed-back circuit, the input stage of the offset cancel circuit, and the second and third change-over switches are implemented on a CMOS.

7. A subscriber circuit comprising:
    a balanced amplifier of an input/output differential type;
    a loop resistance of the balanced amplifier being connected between first and second input terminals of the balanced amplifier;
    change-over switches;
    a direct feed-back circuit; and
    an offset cancel circuit;
    wherein first and second output terminals of the balanced amplifier are alternately connected to an input stage of the direct feed-back circuit through one of the change-over switches,
    wherein an output stage of the direct feed-back circuit and an output stage of the offset cancel circuit have the same circuit configuration and are alternately connected to the input stage of the direct feed-back circuit through another one of the change-over switches to thereby enable call-current polarity switching,
    wherein, during normal feeding, the first output terminal of the balanced amplifier is connected to the input stage of the direct feed-back circuit and the input stage of the direct feed-back circuit is connected to the output stage of the direct feed-back circuit, and
    wherein, during reverse feeding, the second output terminal of the balanced amplifier is connected to the input stage of the direct feed-back circuit and the input stage of the direct feed-back circuit is connected to the output stage of the offset cancel circuit.

8. A subscriber circuit according to claim 7, wherein a first reference voltage is connected to the input stage of the offset cancel circuit, and wherein, during the normal feeding, the input stage of the offset cancel circuit is connected to the output stage of the offset cancel circuit, and, during the reverse feeding, the input stage of the offset cancel circuit is connected to the output stage of the direct feed-back circuit.

9. A subscriber circuit according to claim 8, wherein the input stage of the direct feed-back circuit comprises:
- a first amplifier which multiplies an input voltage by a constant number to produce an output voltage;
- means for adding a first offset voltage to the output voltage of the first amplifier to produce a voltage sum; and
- a voltage discrimination circuit which compares the voltage sum with a second reference voltage so as to output a higher voltage of the voltage sum and the second reference voltage.

10. A subscriber circuit according to claim 9, wherein the output stage of the direct feed-back circuit comprises:
- a first low-pass filter;
- a second amplifier which multiplies an output voltage of the first low-pass filter by a constant number;
- a first adder which adds an output voltage of the second amplifier and a second offset voltage; and
- a first voltage/current conversion circuit for current-converting an output voltage of the first adder.

11. A subscriber circuit according to claim 10, wherein the input stage of the offset cancel circuit comprises a third amplifier which outputs the first reference voltage multiplied by a constant number.

12. A subscriber circuit according to claim 11, wherein the output stage of the offset cancel circuit comprises:
- a second low-pass filter;
- a fourth amplifier which outputs an output voltage of the second low-pass filter multiplied by a constant number;
- a second adder which adds an output voltage of the fourth amplifier together with a third reference voltage; and
- a second voltage/current conversion circuit which current-converts an output voltage of the second adder.

13. A subscriber circuit according to claim 7, wherein the input stage of the direct feed-back circuit, the input stage of the offset cancel circuit, and the second and third change-over switches are implemented on a CMOS.

14. A subscriber circuit comprising:
- a balanced amplifier;
- a loop resistance connected between first and second inputs of the balanced amplifier;
- a first input stage circuit;
- a second input stage circuit supplied with a first reference voltage;
- first and second output stage circuits having the same circuit configuration and being connected to third and fourth inputs of the balanced amplifier, respectively;
- a first switch for alternately connecting first and second outputs of the balanced amplifier to the first input stage circuit;
- a second switch for alternately connecting the first and second output stage circuits to the first input stage circuit; and
- a third switch for alternately connecting the first and second output stage circuits to the second input stage circuit.

15. A subscriber circuit according to claim 14, wherein, during normal feeding, the first input stage circuit is connected between the first output of the balanced amplifier and the first output stage circuit and the second input stage circuit is connected to the second output stage circuit.

16. A subscriber circuit according to claim 15, wherein, during reverse feeding, the first input stage circuit is connected between the second output of the balanced amplifier and the second output stage circuit and the second input stage circuit is connected to the first output stage circuit.

17. A subscriber circuit according to claim 14, wherein the first input stage circuit comprises:
- an amplifier which multiplies an input voltage by a constant number to produce an output voltage;
- means for adding an offset voltage to the output voltage of the amplifier to produce a voltage sum; and
- a voltage discrimination circuit which compares the voltage sum with a second reference voltage so as to output a higher voltage of the voltage sum and the second reference voltage.

18. A subscriber circuit according to claim 14, wherein the second input stage circuit comprises a third amplifier which outputs the first reference voltage multiplied by a constant number.

19. A subscriber circuit according to claim 14, wherein each of the first and second output stage circuits comprises:
- a low-pass filter;
- an amplifier which multiplies an output voltage of the low-pass filter by a constant number;
- an adder which adds an output voltage of the amplifier and an offset voltage; and
- a first voltage/current conversion circuit for current-converting an output voltage of the adder.

20. A subscriber circuit according to claim 14, wherein the first and second input stage circuits and the second and third switches are implemented on a CMOS.

* * * * *